United States Patent
Nash et al.

(10) Patent No.: US 10,223,238 B1
(45) Date of Patent: Mar. 5, 2019

(54) MULTIPLE-STAGE CRASH REPORTING

(71) Applicant: Amazon Technologies, Inc., Seattle, WA (US)

(72) Inventors: Brent Ryan Nash, Redondo Beach, CA (US); Mark Bartlett, Irvine, CA (US); William Allan Dugan, Irvine, CA (US); Joshua Harris, Laguna Hills, CA (US); Drew Repasky, Anaheim, CA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 15/345,749

(22) Filed: Nov. 8, 2016

(51) Int. Cl.
  *G06F 11/36* (2006.01)

(52) U.S. Cl.
  CPC ........ *G06F 11/366* (2013.01); *G06F 11/3624* (2013.01); *G06F 11/3636* (2013.01)

(58) Field of Classification Search
  CPC ............... G06F 11/0778; G06F 11/079; G06F 11/0715; G06F 11/0793; G06F 11/3636; G06F 11/3466; G06F 11/0748; G06F 11/0766; G06F 11/0757
  See application file for complete search history.

(56) References Cited

U.S. PATENT DOCUMENTS

| | | | | |
|---|---|---|---|---|
| 8,782,607 B2 * | 7/2014 | Andersen | ............ | G06F 11/0793 717/101 |
| 9,098,627 B2 * | 8/2015 | Klic | ........................... | G06F 9/44 |
| 9,104,797 B1 * | 8/2015 | Sekhar | .................. | G06F 11/362 |
| 2007/0050848 A1 * | 3/2007 | Khalid | .................... | G06F 21/52 726/24 |
| 2014/0258990 A1 * | 9/2014 | Klic | .................... | G06F 11/3636 717/128 |
| 2017/0249241 A1 * | 8/2017 | Seibert, Jr. | .......... | G06F 11/3676 |

OTHER PUBLICATIONS

"Google Git—Breakpad"; http://web.archive.org/web/20161019115022/https://chromium.googlesource.com/breakpad/breakpad/; Google; from Oct. 19, 2016; accessed Feb. 12, 2018; 4 pages.
"Socorro"; http://wiki.mozilla.org/Socorro; Mozilla Wiki; Aug. 2014; accessed Feb. 12, 2018; 3 pages.
Matt Bollier; Rollbar; http://web.archive.org/web/20161020152623/https://rollbar.com/; RollBar, Inc.; © 2012-16; from Oct. 20, 2016; accessed Feb. 12, 2018; 5 pages.
"Introduction"; https://chromium.googlesource.com/breakpad/breakpad/+/master/docs/getting_started_with_breakpad.md; Sep. 22, 2015; accessed Aug. 3, 2017; 4 pages.

* cited by examiner

*Primary Examiner* — Nadeem Iqbal
(74) *Attorney, Agent, or Firm* — Baker & Hostetler LLP

(57) ABSTRACT

Techniques for multiple-stage crash reporting are described herein. In particular, in some cases, a first stage may include reporting of crash metadata. Also, in some cases, a second stage may include reporting of crash artifact data, such as a crash dump file, error logs, server logs, client logs and/or other data. The crash artifact data may, in some examples, be provided after the crash metadata. By employing multiple stages for reporting of crash-related information, the time required to notify and provide at least some crash-related information to users may be reduced, without requiring the omission of any desired reporting information. Additionally, the use of multiple stages may help to ensure that a notification of the occurrence of the crash and associated metadata are consistently reported, even when crash artifact data uploads fail.

20 Claims, 10 Drawing Sheets

Crash Information Search Interface 600

| | | | | |
|---|---|---|---|---|
| Program Name | 611 | | Component | 615 |
| Start Date / Time | 612 | | End Date / Time | 616 |
| Program Version | 613 | | Engine Version | 617 |
| Client ID | 614 | | Stack Trace Terms | 618 |

Submit Search 620

| Crash Link 631 | Crash Date / Time 632 | Program Name 633 | Component 634 | Program Version 635 | Client ID 636 | Platform 637 | Stack Trace 638 | Crash Artifact Data 639 |
|---|---|---|---|---|---|---|---|---|
| Link 641 | xxx | xxx | xxx | xxx | xxx | xxx | Show 648 | Download 649 |
| Link 641 | xxx | xxx | xxx | xxx | xxx | xxx | Show 648 | Download 649 |
| Link 641 | xxx | xxx | xxx | xxx | xxx | xxx | Show 648 | Download 649 |
| Link 641 | xxx | xxx | xxx | xxx | xxx | xxx | Show 648 | Download 649 |

FIG. 6

MULTIPLE-STAGE CRASH REPORTING

BACKGROUND

The reporting of crashes and crash-related data is an important aspect of program execution and debugging. Program developers may often wish to obtain crash-related data promptly after the occurrence of a crash, thereby allowing the developers to analyze information and quickly identify and correct defects and problems. Developers of certain interactive and other computer programs, such as video games, may often have their programs hosted by a service that enables large quantities of users to access and interact with the hosted computer programs. By quickly identifying errors and debugging programs, the user experience may be improved. For example debugging of a program may increase efficiency and reliability, such as by improving program performance and reducing the probability that a user will encounter an error while interacting with the program.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 6 is a diagram illustrating an example crash information search interface that may be used in accordance with the present disclosure.

DETAILED DESCRIPTION

Figure 1:
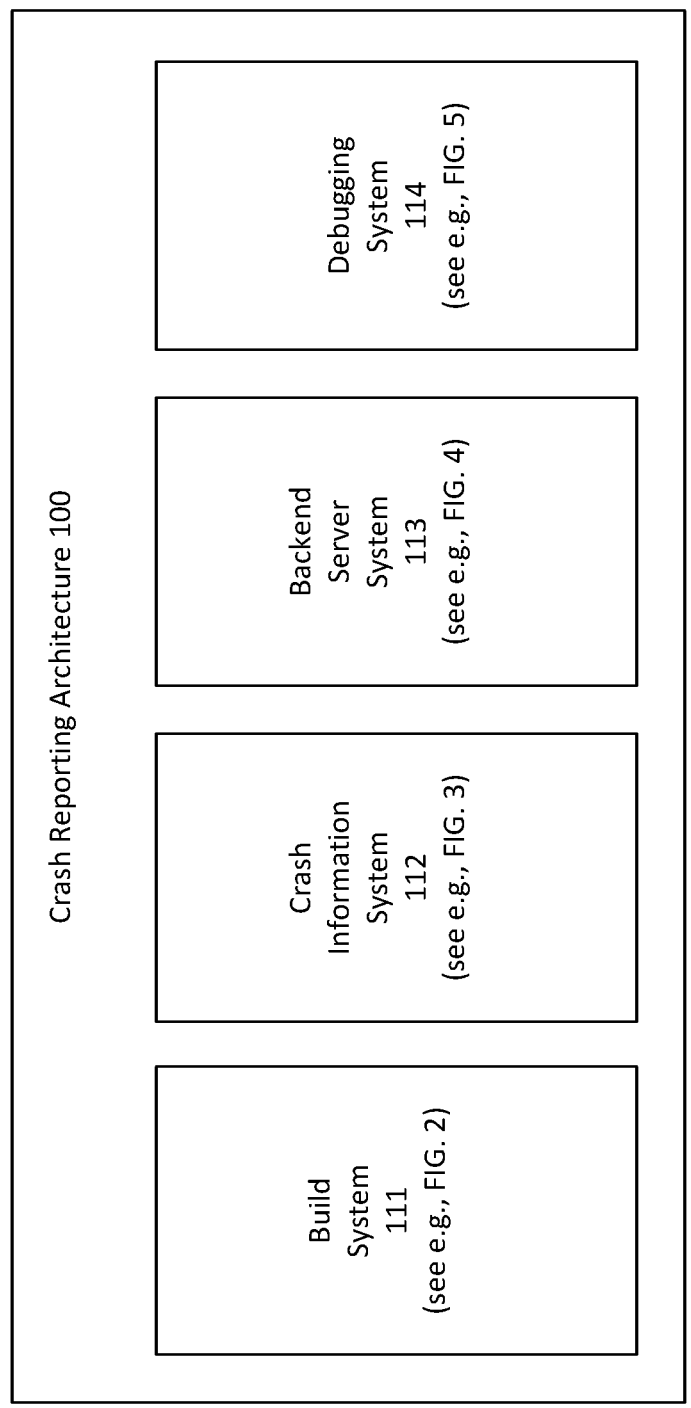
FIG. 1 is a diagram illustrating an example crash reporting architecture that may be used in accordance with the present disclosure.

Techniques for multiple-stage crash reporting are described herein. In one embodiment, crash information may be reported using at least two stages. In particular, in some cases, a first stage may include reporting of crash metadata (e.g., crash identifier, timestamp, program name, program version, client identifier, session identifier, platform name, platform version, etc.). Also, in some cases, a second stage may include reporting of crash artifact data, such as a crash dump file, error logs, server logs, client logs and/or other data. The crash artifact data may, in some examples, be provided after the crash metadata, such as due to additional time that may be required to collect and process the crash artifact data. By employing multiple stages for reporting of crash-related information, the time required to notify and provide at least some crash-related information to users may be reduced, without requiring the omission of any desired reporting information. Additionally, the use of multiple stages may help to ensure that a notification of the occurrence of the crash and associated metadata are consistently reported, even when crash artifact data uploads fail.

The described techniques may also, for example, include providing of notifications (e.g., event hooks), such as for various selected events that relate to the crash reporting process. Such notifications may, for example, allow data related to the events to be easily obtained and used by other systems (e.g., telemetry), custom (e.g., program-specific) processing flows, and other subscribers. Additionally, in one embodiment, stack trace generation may be performed at a secure backend server, which may enable programs to be deployed and executed without debugging symbols, thereby reducing the size of deployed programs and improving program security. Furthermore, in one embodiment, crash data may be identified as being received from a trusted or untrusted source, and crash data from trusted and untrusted sources may be treated differently, such as by being stored at separate locations and/or being processed with greater scrutiny during debugging. This may help to reduce or prevent exposure to malicious crash data and/or prevent the spread of such malicious data throughout the system.

In one embodiment, a program, such as a video game, business or productivity program, or another computing application, may be analyzed to obtain debugging symbols, which may include information that associates programming-language constructs with corresponding portions of program code. In some cases, the debugging symbols may be translated from a platform-specific (e.g., operating system (OS)-specific) format to a platform-independent format. The platform-independent format may be advantageous, for example, by allowing the debugging symbols to be more efficiently used for stack trace generation and other analysis, such as by computing components that may execute on a different platform than the program itself. In one embodiment, a notification may then be provided that the debugging symbols are available for download, and the debugging symbols may be queued for download. One or more download components may then be employed to download the debugging symbols to a server-accessible storage location. The quantity of download components employed by the system may be scaled up or down in quantity, for example based on an amount of debugging symbols queued for download.

Additionally, in one embodiment, the debugging symbols may be stripped from the program, and the resulting program may then be deployed and executed, for example at one or more servers and/or clients. Upon being deployed and executed, the program may be monitored, for example by an out-of-process (e.g., external to a process that executes the monitored program) monitoring component, to detect a program crash. In some cases, the use of an out-of-process monitoring component may improve stability and reliability, for example by not relying on a crashed process to report its own crash information (e.g., because key data structures, stack elements, and other data may be corrupted during the crash). Additionally, the out-of-process monitoring component may also improve efficiency, for example by allowing multiple programs to be monitored by a single monitoring component. Upon detection of a program crash, crash metadata may be generated and promptly made available to users. Additionally, a notification of the crash and/or crash metadata may also be promptly provided to users and other interested subscribers.

Crash artifact data for the crash may also be collected and provided to a designated location for use in stack trace generation and other processing. In one embodiment, crash artifact data from a trusted source may be stored at a location that is separate from crash artifact data from untrusted sources. A notification may then be provided that the crash artifact data is available, and the crash artifact data may be queued for stack trace generation. In one embodiment, a quantity of server components that are employed for stack trace generation may be scaled up or down in quantity, for example based on the amount of queued crash artifact data. In some examples, one or more server stack trace generation components may then retrieve the crash artifact data associated with the crash and the stored debugging symbols associated with program. A stack trace for the crash may then be generated based, at least in part, on the retrieved crash artifact data and debugging symbols. Upon completion of the stack trace, the stack trace may be made available, and a notification of the availability of the stack trace may be provided to users and other interested subscribers.

FIG. 1 is a diagram illustrating an example crash reporting architecture 100 that may be used in accordance with the present disclosure. In the example of FIG. 1, crash reporting architecture 100 includes a build system 111, a crash information system 112, a backend server system 113, and a debugging system 114. In some examples, build system 111 may generally perform operations relating to generating and obtaining debugging symbols for a program, translating the debugging symbols from a platform-specific to a platform independent format, and storing the debugging symbols at a server-accessible location. An example build system architecture is described in greater detail below, such as with reference to FIG. 2. In some examples, crash information system 112 may generally perform operations relating to monitoring and detecting of a program crash, retrieval of crash metadata associated with the crash, and retrieval of crash artifact data associated with the crash. An example crash information system architecture is described in greater detail below, such as with reference to FIG. 3. In some examples, backend server system 113 may generally perform operations relating to notifications of a crash and/or crash metadata, generation of a stack trace based, at least in part, on associated crash artifact data and debugging symbols, and providing of the stack trace and a notification thereof. An example backend server system architecture is described in greater detail below, such as with reference to FIG. 4. In some examples, debugging system 114 may generally perform operations relating to presenting crash information to users, such as crash metadata, crash artifact data, stack traces, debugging symbols, and other information, such as to enable debugging of a crashed program. An example debugging system architecture is described in greater detail below, such as with reference to FIG. 5.

Figure 2:
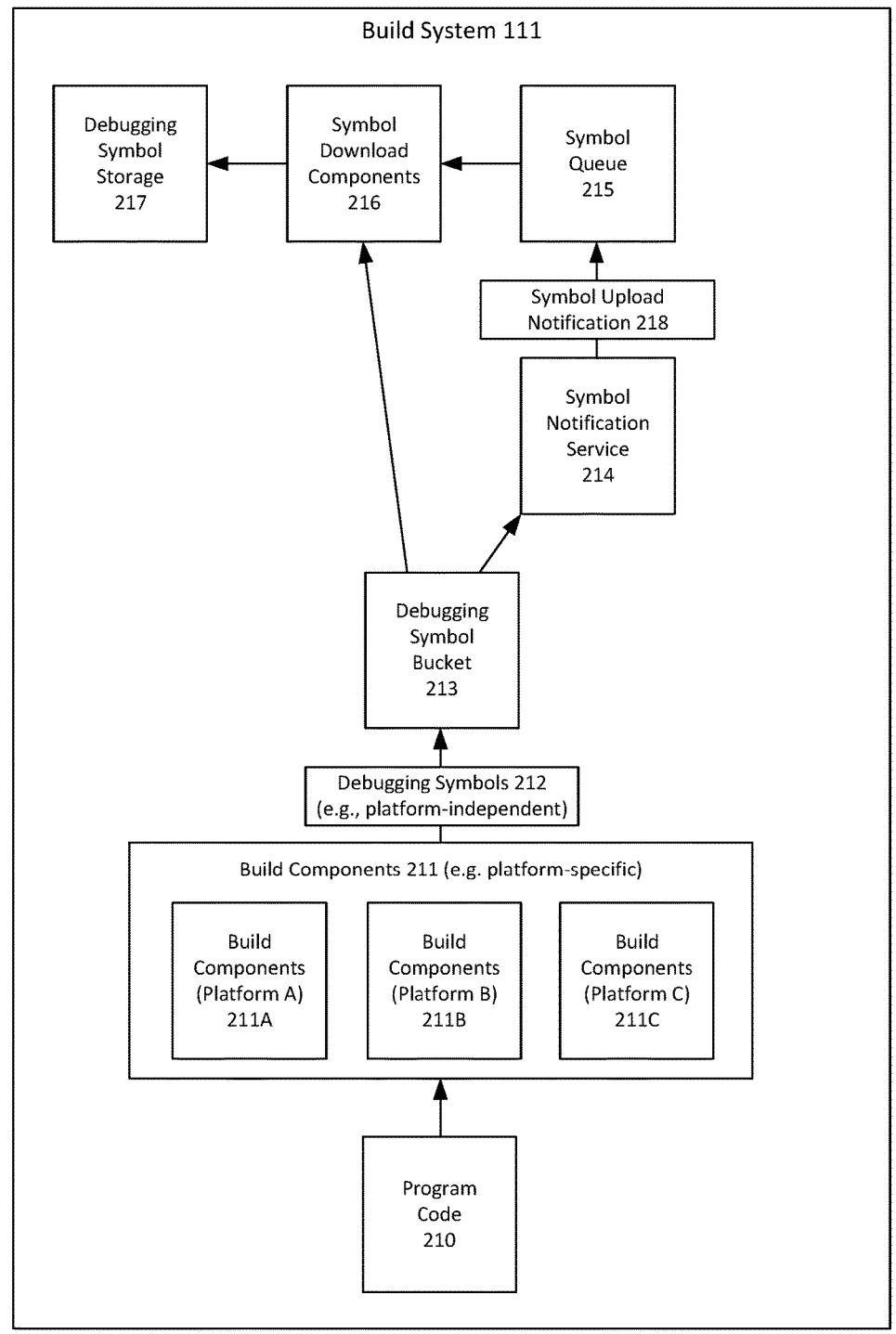
FIG. 2 is a diagram illustrating an example build system that may be used in accordance with the present disclosure.

Referring now to FIG. 2, an example build system 111 will now be described in detail. As shown in FIG. 2, build system 111 includes build components 211, which may receive program code 210 corresponding to one or more programs along with associated debugging symbols 212. It is noted that, in some examples, the debugging symbols 212 may be generated via a build process of a service that hosts execution of a computer program as well as any number of other external or other sources. As set forth above, debugging symbols 212 may include information that associates programming-language constructs with corresponding portions of program code 210. In one embodiment, the build components 211 may be platform-specific to enable building of games formatted for a respective platform. In FIG. 2, build components 211 include build components 211A, which correspond to a respective Platform A, build components 211B, which correspond to a respective Platform B, and build components 211C, which correspond to a respective Platform C. In one embodiment, Platforms A-C may each correspond to a different respective operating system. In one embodiment, build components 211 may translate debugging symbols 212 for a particular program from a platform-specific (e.g., OS-specific) format to a platform-independent (e.g., OS-independent) format. As set forth above, the platform-independent format may be advantageous, for example, by allowing the debugging symbols to be more efficiently used for stack trace generation and other analysis, such as by computing components that may execute using a different platform than the program itself.

As also shown in FIG. 2, upon being translated to a platform-independent format, debugging symbols 212 may be uploaded to a debugging symbol bucket 213, which may serve as a temporary storage location for the debugging symbols 212. The debugging symbols bucket 213 may, in turn, generate a symbol upload notification 218, for example via symbol notification service 214, each time that a set of debugging symbols is uploaded to the debugging symbols bucket 213. Symbol queue 215 may include a queue for available uploaded debugging symbols 212 that are waiting to be downloaded to debugging symbol storage 217, which may be a server-accessible storage location (e.g., accessible to backend server system 113) for the debugging symbols 212. Symbol queue 215 may be notified of when debugging symbols 212 become available for queueing by subscribing to receive the symbol upload notifications 218 from symbol notification service 214. In one embodiment, in addition to symbol queue 215, other interested services, components, and other systems may also subscribe to receive symbol upload notifications 218, for example to perform additional analysis, custom processing, or make other use of the debugging symbols 212. In one embodiment, the symbol queue 215 may include a first queue in which debugging symbols may be initially queued and a separate second queue for queueing of debugging symbols 212 that were unable to be downloaded after being retrieved from the first queue. This may allow the debugging symbols to be retained in the second queue for subsequent downloading, for example after an error or other defect with the downloading process has been identified and resolved. Also, in one embodiment, after a specified number of unsuccessful download attempts are performed, the debugging symbols 212 may be added to another queue (e.g., a dead letter queue), for example to trigger input from a developer or other user to assist in identifying and fixing errors associated with the debugging symbols 212. It is noted that portions of this description that refer to queueing of information, such as debugging symbols, crash artifact data, and other information, do not necessarily require the information itself be included in, or stored in, a queue. Rather, the queueing of information (or adding or assigning of information to a queue), as those and other related terms are used herein, may instead refer to merely queueing a reference to the queued information, such as a reference that identifies the information and, in some cases, indicates where the identified information is stored.

Symbol download components 216 may generally interact with symbol queue 215 to identify queued debugging symbols 212 and download the queued debugging symbols 212 to debugging symbol storage 217. In one embodiment, the symbol download components 216 may be scaled up or down in quantity and/or capacity depending upon the amount (e.g., quantity, size, complexity, etc.) of debugging symbols 212 that are queued for download at any given time. For example, during times when larger amounts of debugging symbols 212 are queued and waiting for download, symbol download components 216 may be scaled-up by assigning additional computing resources to symbol download components 216. By contrast, during times when smaller amounts of debugging symbols 212 are queued and waiting for download, symbol download components 216 may be scaled-down by unassigning existing computing resources from symbol download components 216. This may help to free computing resources to perform other necessary tasks, while also reducing delays in downloading of debugging symbols 212 during peak periods.

Figure 3:
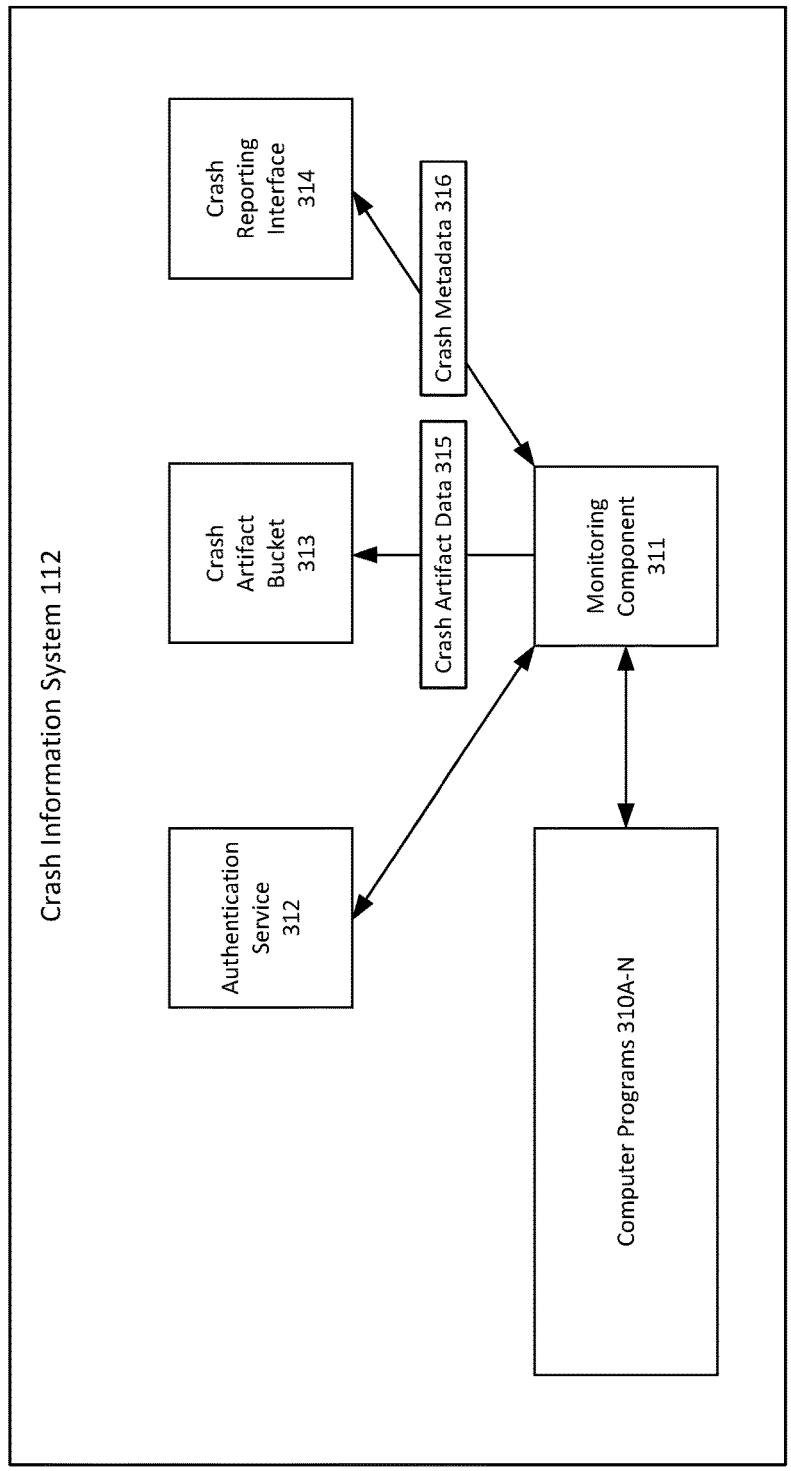
FIG. 3 is a diagram illustrating an example crash information system that may be used in accordance with the present disclosure.

Referring now to FIG. 3, an example crash information system 112 will now be described in detail. As shown in FIG. 3, crash information system 112 includes computer programs 310A-N and a monitoring component 311. In some examples, computer programs 310A-N may include video games, business or productivity programs, or other computing applications. Computer programs 310A-N may be deployed to, and executed by, any combination of one or more clients and/or one or more servers. In one embodiment, the debugging symbols 212 of FIG. 2 may be stripped from computer programs 310A-N before deployment and execution of the computer programs 310A-N. Stripping of the debugging symbols 212 may, for example, improve security and reduce the size of deployed programs, thereby potentially reducing deployment times and costs. Monitoring component 311 may monitor computer programs 310A-N, for example to detect and respond to program crashes. In one embodiment, monitoring component 311 may be an out-of-process (e.g., external to a process that executes a computer program 310A-N) monitoring component 311. As set forth above, the use of an out-of-process monitoring component 311 may improve stability and reliability, for example by not relying on a crashed process to report its own crash information (e.g., because key data structures, stack elements, and other data may be corrupted during the crash). Additionally, an out-of-process monitoring component may also improve efficiency, for example by allowing a single monitoring component to monitor a plurality of computer programs that are registered to the monitoring component. In one embodiment, when a computer program is launched, it may be programmed to determine whether there is a designated monitoring component for the computer program that is currently active. If so, then the launched computer program may register with the active designated monitoring component. If not, then the computer program may launch a designated monitoring component and then register with the launched monitoring component.

In one embodiment, when it is first launched, the monitoring component 311 may authenticate with an authentication service 312 to retrieve credentials that may be used to communicate with the backend server system 113. Also, in one embodiment, a similar login process may be used for computer programs 310A-N, for example in which a program user (e.g., a player of a video game) may be required to log in via an assigned account. In one embodiment, in the case of an authenticated client computer program 310A-N, a management service may be employed to retrieve credentials that may be passed to the monitoring component 311 so that it may be treated as a trusted source of data. Also, in some examples, in the case of a server computer program 310A-N, a separate unauthenticated identity pool (or other similar technique) may be employed for servers to use to create credentials for uploading crashes. As will be described in detail below, in the backend server system 113, authenticated and unauthenticated crash uploads may be stored separately from one another, while client and server crash uploads may also be stored separately from one another, thereby allowing those crash uploads to be treated differently at the debugging stage.

A crash monitoring client may, for example, be included within each executing computer program 310A-N, while a crash monitoring server may be included within crash monitoring component 311, which may, for example, communicate with each computer program 310A-N via an interprocess communication (IPC) mechanism such as a named pipe. When a crash occurs, the crash monitoring client may signal the crash monitoring server, which may then proceed to generate crash artifact data 315, such as a crash dump file, error logs, server logs, client logs and/or other data. Once the crash monitoring component 311 has detected a crash, it may use its assigned credentials to upload crash information to the backend server system 113. In one embodiment, crash information uploading may employ two stages: a metadata upload stage and a crash artifact upload stage. In some examples, the crash monitoring component 311 may first provide, to crash reporting interface 314, crash metadata 316. The crash metadata 316 may include, for example, a crash identifier, a crash timestamp, an elapsed time between the crash and the program start, a program name, a component name, an engine version, a program version, a client identifier, a session identifier, a platform name, a platform version, a graphics device, a graphics card, a graphics memory amount, a locale, a crash time, a redacted client internet protocol (IP) address, a crash file type, and other metadata.

In one embodiment, crash reporting interface 314 may include an application programming interface (API) or other interface that may provide, to monitoring component 311, information for uploading of the crash artifact data 315 to a crash artifact bucket 313. For example, this information may include a location (e.g., crash artifact bucket 313 and corresponding key) as well as temporary credentials for uploading of the crash artifact data 315. With this information, the monitoring component 311 may upload the crash artifact data 315 to the crash artifact bucket 313, for example using a multi-part parallelized upload. In some examples, the end user may be prevented from communicating with the monitoring component 311, for example to reduce the chance of the monitoring component 311 being interrupted or canceled by the end user. In addition, in some examples, the monitoring component 311 may employ an operating system (OS)-level mutex to attempt to ensure that only one instance of the monitoring component 311 is running at any given time. In some cases, when each of the monitored computing programs 310A-N has stopped executing, the monitoring component 311 may self-terminate.

Figure 4:
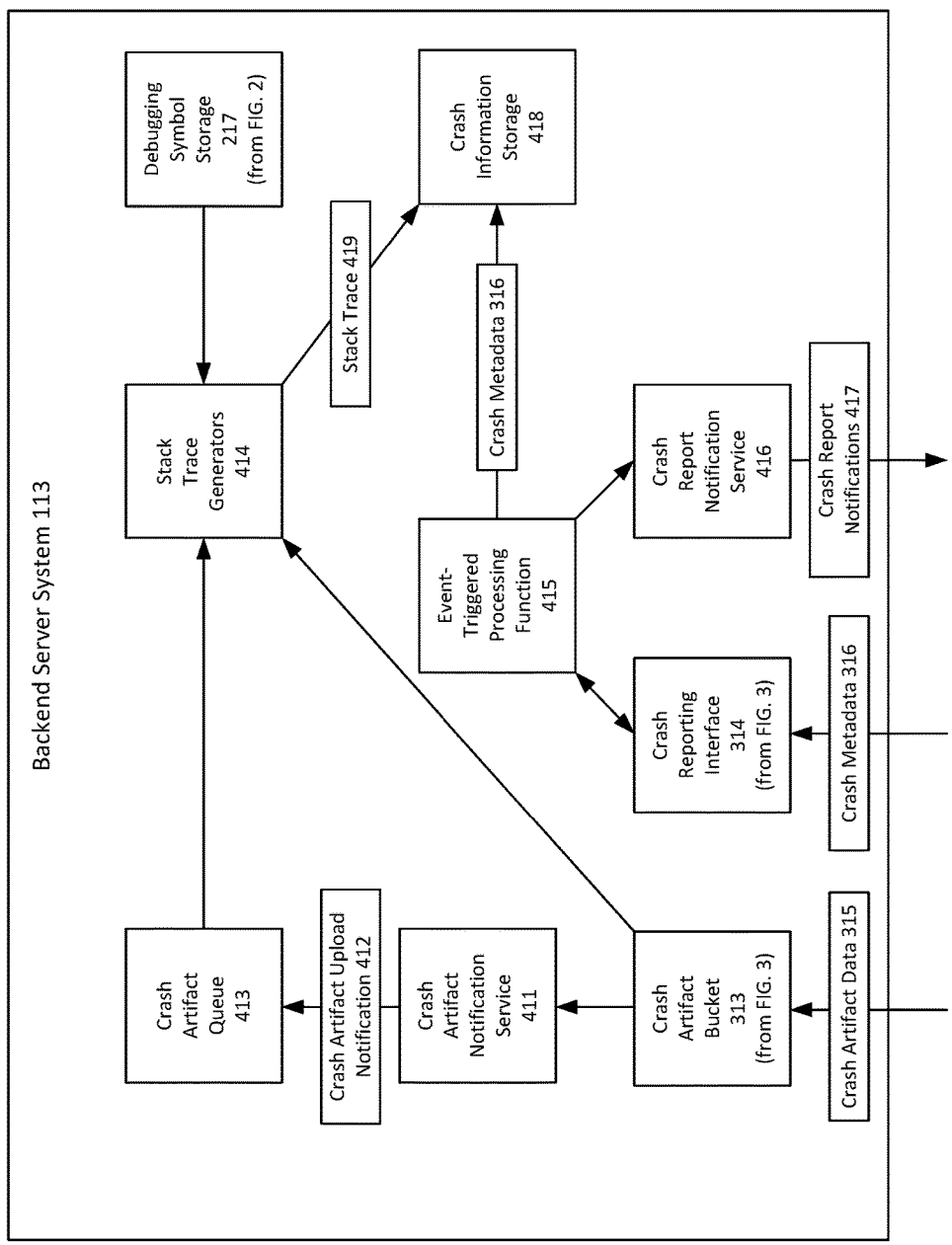
FIG. 4 is a diagram illustrating an example backend server system that may be used in accordance with the present disclosure.

Referring now to FIG. 4, an example backend server system 113 will now be described in detail. As shown in FIG. 4, backend server system 113 includes a crash reporting interface 314, such as may be hosted via an API gateway, which receives crash metadata 316 from monitoring component 311 of FIG. 3. In some cases, hosting of crash reporting interface 314 via certain API gateways may potentially provide a number of convenience mechanisms, such as throttling, Distributed Denial of Service (DDoS) protection, logging, monitoring, and others. In one embodiment, crash metadata 316 may be reportedly separately, before crash artifact data 315, by the monitoring component 311. One example reason for this two-stage reporting process is to reduce the turn-around time from crash detection to notification and storage. This two-stage reporting process may also, in some examples, provide a single unified API or other interface and resilience to properly catalog all crashes, even in the event that crash artifact data uploads fail.

As set forth above, when a crash occurs, the monitoring component 311 may contact crash reporting interface 314 to supply the crash metadata 316 in reference to the crash that just occurred. Upon receipt of the crash metadata 316, the crash reporting interface 314 may invoke a custom event-triggered processing function 415 that may provide a real-time (or otherwise prompt) crash report notification 417 to interested subscribers, for example via crash report notification service 416. In some examples, the subscribers to crash report notification 417 may include program developers, a service for reporting of crash metadata 316 to a telemetry system, custom (e.g., program-specific) process flows, and many other subscribers. Event-triggered processing function 415 may also store the crash metadata 316 in crash information storage 418, which may be a searchable storage cluster for crash information. Additionally, the event-triggered processing function 415 may generate crash artifact data upload information, such as a location (e.g., crash artifact bucket 313 and corresponding key) as well as temporary credentials for uploading of the crash artifact data 315. In one embodiment, to improve security, the temporary credentials may enable uploading only to a specific bucket and key pair or other designated location.

As set forth above, the monitoring component 311 of FIG. 3 may use the above described information to upload crash artifact data 315 to crash artifact bucket 313. In one embodiment, crash artifact data 315 may be packed into a compressed file and uploaded as a single file. Also, in some examples, parallelized multi-part uploads may be employed, such as to reduce upload duration. In some cases, crash artifact data 315 from trusted and/or authenticated sources may be stored at a different location (e.g., folder within crash artifact bucket 313) than crash artifact data 315 from untrusted and/or unauthenticated sources. This may, for example, allow information from untrusted and/or unauthenticated sources to be treated with more scrutiny when debugging. It is noted that, in some examples, a crash reporting system may maintain a list of known trusted users, and crash artifact data 315 may be considered trusted when the crash artifact data 315 is obtained from a program having a client and/or user that is included in the list of known trusted users. Otherwise, in some examples, the crash artifact data may be considered untrusted. This known list of trusted users may provide an additional layer of security, for example by requiring users and/or clients to be known and trusted (for example as opposed to merely logging in or otherwise verifying their identity).

Upon uploading of the crash artifact data 315, crash artifact bucket 313 may provide a crash artifact upload notification 412 to interested subscribers, for example via crash artifact notification service 411. In some examples, the subscribers to crash artifact upload notification 412 may include crash artifact queue 413, a service for reporting of crash artifact data 315 to a telemetry system, custom (e.g., program-specific) process flows, and many other subscribers. Crash artifact queue 413 may be employed to queue uploaded crash artifact data 315 for generation of a respective stack trace 419 by stack trace generators 414. In some examples, the stack trace generators 414 may be scaled up or down in quantity and/or capacity depending upon the amount (e.g., quantity, size, complexity, etc.) of crash artifact data 315 that is queued at any given time. For example, during times when larger amounts of crash artifact data 315 are queued, stack trace generators 414 may be scaled-up by assigning additional computing resources to stack trace generators 414. By contrast, during times when smaller amounts of crash artifact data 315 are queued, stack trace generators 414 may be scaled-down by unassigning existing computing resources from stack trace generators 414. This may help to free computing resources to perform other necessary tasks, while also reducing delays in stack trace generation during peak periods.

In one embodiment, the crash artifact queue 413 may include a first queue in which crash artifact data 315 may be initially queued and a separate second queue for queueing of crash artifact data 315 for which a stack trace was unable to be generated after being retrieved from the first queue. This may allow the crash artifact data 315 to be retained in the second queue for subsequent stack trace generation, for example after an error or other defect with the crash artifact data 315 has been identified and resolved. Also, in some examples, a delay in downloading of the respective debugging symbols 212 may also result in an inability to generate the stack trace 419, and, in some cases, the crash artifact data 315 may be retained in the second queue until the respective debugging symbols 212 have been downloaded and made available to the stack trace generators 414. Also, in one embodiment, after a specified number of unsuccessful stack trace generation attempts are performed, the crash artifact data 315 may be added to another queue (e.g., a dead letter queue), for example to trigger input from a developer or other user to assist in identifying and fixing errors associated with the crash artifact data 315.

Stack trace generators 414 may, for example, retrieve a reference to a crash from the crash artifact queue 413, download the respective crash artifact data 315 from crash artifact bucket 313, retrieve the respective debugging symbols 212 from debugging symbol storage 217, and generate the stack trace 419 (e.g., a human-readable stack trace) based, at least in part, on the respective crash artifact data 315 and debugging symbols 212. As set forth above, because the debugging symbols 212 may be translated into a platform-independent format, stack trace generators 414 need not necessarily execute on the same platform as the crashed program. Once the stack trace 419 is available, stack trace generators 414 may identify a corresponding crash record within crash information storage 418 and update that record with the stack trace 419 and, in some cases, crash artifact data 315. Stack trace generators 414 may also provide a notification to interested subscribers (e.g., developers, telemetry systems, custom process flows, etc.) that the stack trace 419 is available. At this point, developers may be capable of accessing all crash information and artifacts they need to do in-depth debugging of the reported crash. In some examples, to allow more efficient and robust searching, crash information storage 418 may be a datastore that allows free query across a number of different metadata fields.

Figure 5:
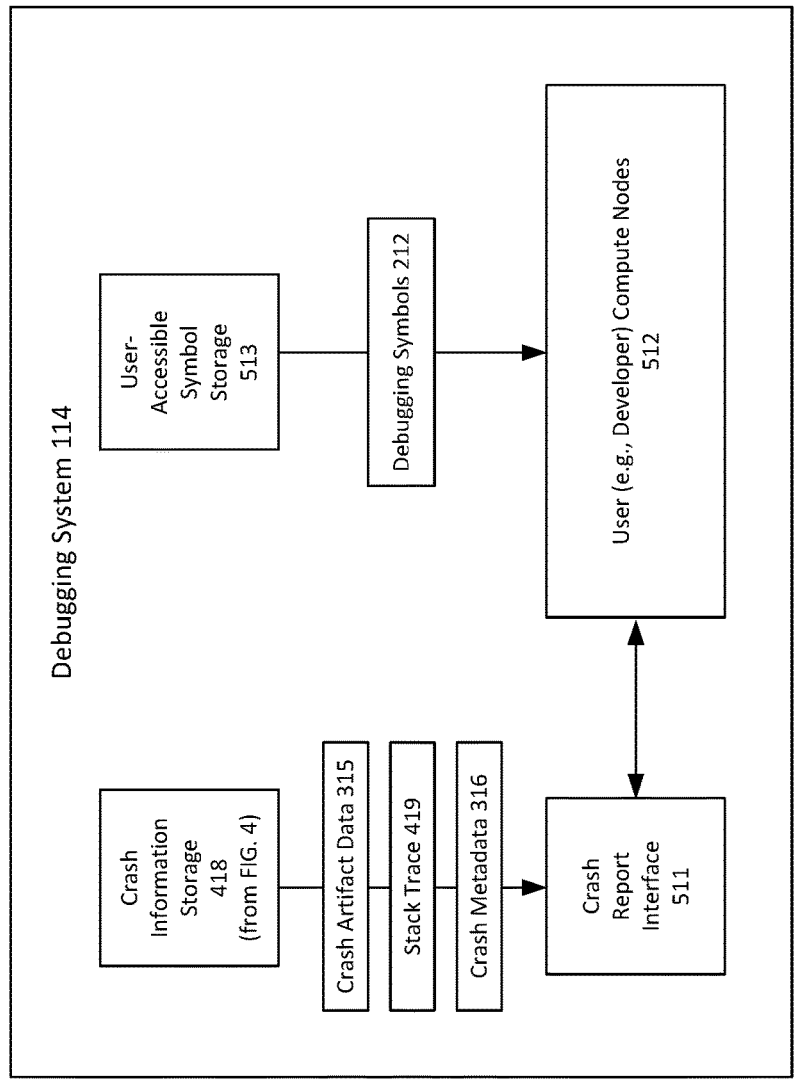
FIG. 5 is a diagram illustrating an example debugging system that may be used in accordance with the present disclosure.

Referring now to FIG. 5, an example debugging system 114 will now be described in detail. As shown in FIG. 5, user computer nodes 512, such as may be operated by one or more program developers or other users, are connected to a crash report interface 511 to obtain crash report information. In one embodiment, crash report interface 511 may include a web interface and/or other types of user interfaces, for example that allow searching and retrieval of information from crash information storage 418. As set forth above, crash information storage 418 may be a searchable information cluster that includes crash metadata 316, stack trace 419, crash artifact data 315, and/or other crash information. In some examples, crash report interface 511 may allow searching of crash information storage 418 to discover crashes that have occurred and their corresponding crash information. In addition, other analysis tools, such as a periodic (e.g., daily, weekly, etc.) crash summary reporter, may also be driven off of crash information storage 418. Crash information storage 418 may also allow use of various plugins and other additional components to perform analysis and create dashboards. Once a user has been made aware of a crash, the user may download information for that crash and debug it. In some examples, stack trace 419 and/or crash artifact data 315, such as a dump file, may be available via the crash report interface 511. The debugging symbols 212 may also be available to a user, for example via user-accessible symbol storage 513, for example in association with a network file system and/or associated search path. In some examples, once users have downloaded the stack trace 419, the crash artifact data 315, and/or the debugging symbols 212, the debugging process may be performed.

Referring now to FIG. 6, an example crash information search interface 600 will now be described in detail. In one embodiment, crash information search interface 600 may be provided as an example feature of crash report interface 511 described above. As shown in FIG. 6, interface 600 includes various example search fields 611-618 that may be used to indicate example criteria for searching and retrieving of crash information. In the example of FIG. 6, search field 611 is used to indicate a selected program name, search field 612 is used to indicate a selected start date and/or time for a range in which crashes occur, search field 613 is used to indicate a selected program version, search field 614 is used to indicate a selected client identifier (ID), search field 615 is used to indicate a selected component (e.g., client, server, etc.), search field 616 is used to indicate a selected end date and/or time for a range in which crashes occur, search field 617 is used to indicate a selected engine version, search field 618 is used to indicate selected sack trace terms. As should be appreciated, search fields 611-618 are merely examples and many other additional or alternative search fields may be employed.

After entering selected criteria into one or more of search fields 611-618, submit search button 620 may be selected to cause a search of a collection of stored crash information (e.g., crash information storage 418 of FIGS. 4 and 5) to identify one or more crashes that meet the selected criteria and to return crash information for those identified crashes. In the example of FIG. 6, the identified crashes that meet the selected search criteria and their corresponding information may be indicated using a graph including columns 631-639. Each row of the graph includes information and/or options for a respective identified crash. In the example of FIG. 6, crash link column 631 provides a link 641 to a crash record or other crash information collection for each identified crash, crash date/time column 632 indicates a date and/or time at which each identified crash occurred, program name column 633 indicates a program name for each identified crash, component column 634 indicates a component for each identified crash, program version column 635 indicates a program version for each identified crash, client ID column 636 indicates a client ID for each identified crash, platform column 637 indicates a platform (e.g., operating system) for each identified crash, stack trace column 638 allows a stack trace to be shown for each identified crash (e.g., by selecting a respective show button 648), and crash artifact data column 639 allows crash artifact data to be downloaded for each identified crash (e.g., by selecting a respective download button 649). As should be appreciated, columns 631-639 are merely examples and many other additional or alternative columns for showing or requesting additional information may be employed.

Figure 7A:
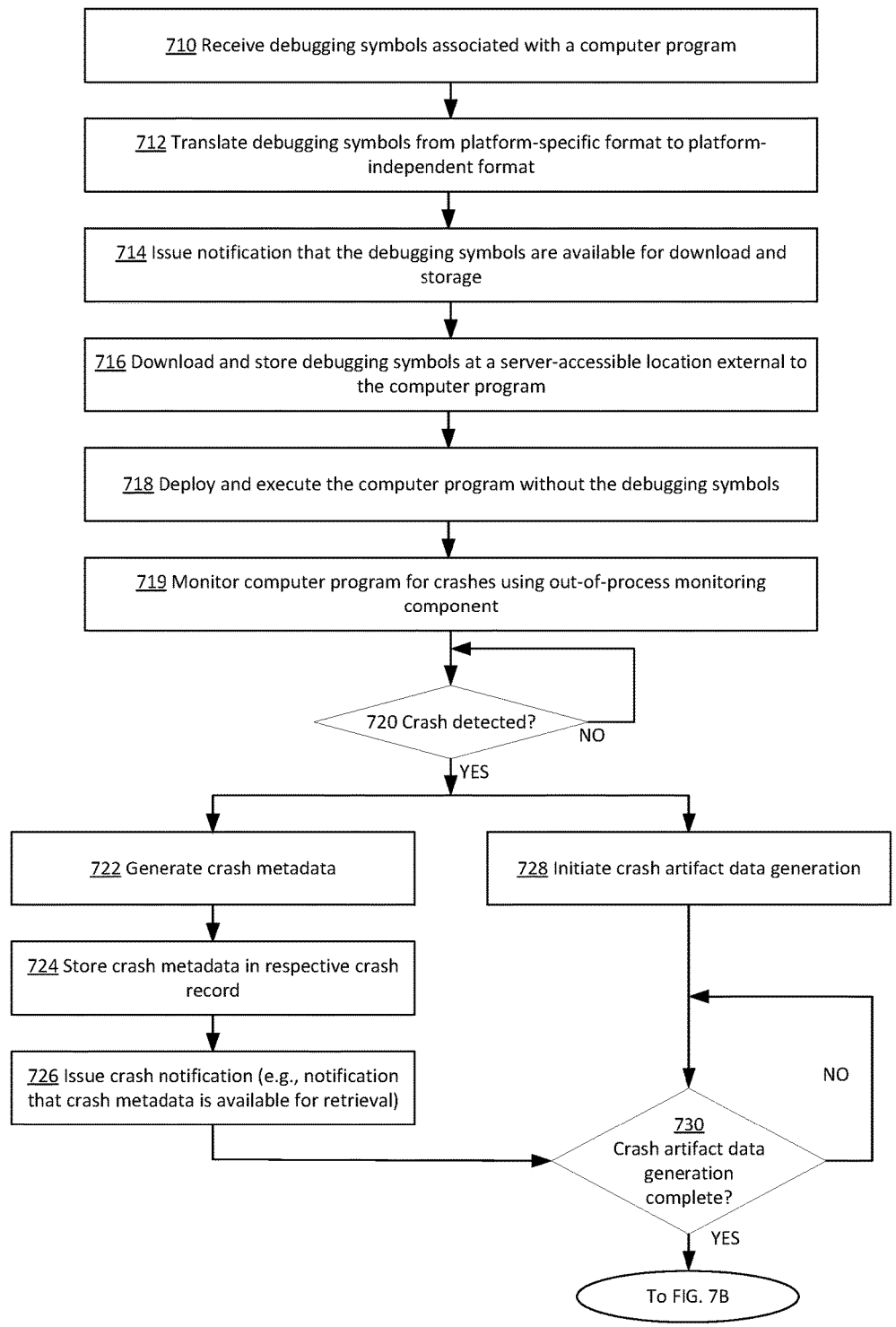
FIGS. 7A and 7B are flowcharts illustrating an example an example multiple stage crash reporting process that may be used in accordance with the present disclosure.
Figure 7B:
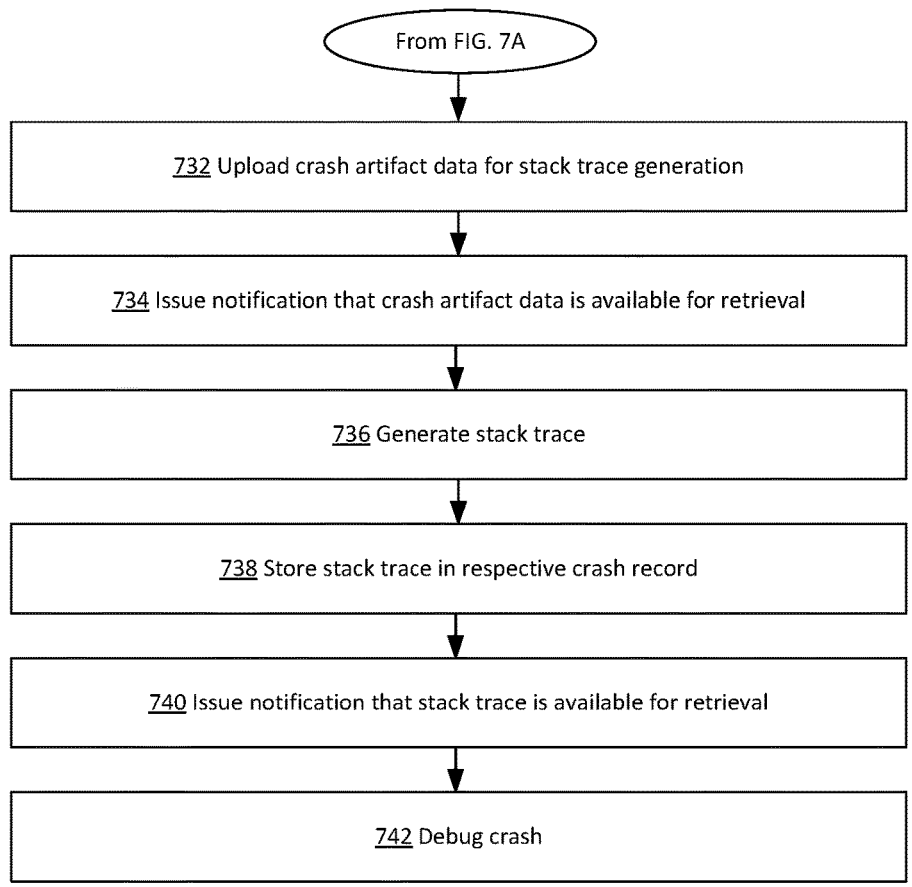

FIGS. 7A and 7B are flowcharts illustrating an example an example multiple stage crash reporting process that may be used in accordance with the present disclosure. Referring now to FIG. 7A, the process is initiated at operation 710, at which debugging symbols associated with a computer program are received. In some examples, the debugging symbols may be included in, or otherwise associated with, the computer program. Also, in one embodiment, the debugging symbols may be received via one or more platform-specific (e.g., OS-specific) build components, such as build components 211A-C of FIG. 2. Thus, in some examples, the debugging symbols may be initially received in a platform-specific format. At operation 712, the debugging symbols may be translated from a platform-specific (e.g., OS-specific) format to a platform-independent (e.g., OS-independent) format. As set forth above, the platform-independent format may be advantageous, for example, by allowing the debugging symbols to be more efficiently used for stack trace generation and other analysis, such as by computing components that may execute using a different platform than the computer program itself.

At operation 714, a notification is issued that the debugging symbols are available for download and storage. For example, in some cases, upon being translated to a platform-independent format, the debugging symbols may be uploaded to a temporary storage location, such as debugging symbol bucket 213 of FIG. 2. Each time that a set of debugging symbols is uploaded to this temporary storage location, it may issue a respective notification that the uploaded debugging symbols are available for download and storage. The notification may be issued via a service, such as symbol notification service 214 of FIG. 2. As set forth above, in some examples, an assigned queue (e.g., symbol queue 215 of FIG. 2) may subscribe to this notification in order to queue the debugging symbols for downloading. At operation 716, the debugging symbols are downloaded and stored in a server accessible location external to the computer program. For example, the symbol download queue may be serviced by a set of download components (e.g., symbol download components 216 of FIG. 2) to download the debugging symbols to an assigned server-accessible storage location (e.g., debugging symbol storage 217 of FIG. 2) that is external to the computer program. In one embodiment, the symbol download components may be scaled up or down in quantity and/or capacity depending the size of the debugging symbol queue at any given time. The debugging symbol storage 217 may also scale up or down in capacity, for example depending upon the size, amount, and/or complexity of stored debugging symbols at any given time.

At operation 718, the computer program is deployed and executed without the debugging symbols. In one embodiment, the debugging symbols may be stripped from the computer program prior to deployment and execution of the computer program. One or more instances of the computer program may then be deployed to, and executed by, one or more servers and/or one or more clients. At operation 719, the computer program is monitored by an out-of-process (e.g., external to a process that executes the computer program 310A-N) monitoring component. As set forth above, the use of an out-of-process monitoring component 311 may improve stability and reliability, for example by not relying on a crashed process to report its own crash information (e.g., because key data structures, stack elements, and other data may be corrupted during the crash). Additionally, the out-of-process monitoring component may also improve efficiency, for example by allowing a single monitoring component to monitor a plurality of computer programs that are registered to the monitoring component. For example, in some cases, when a computer program is launched, it may be programmed to determine whether there is a designated monitoring component for the computer program that is currently active. If so, then the launched computer program may register with the active designated monitoring component. If not, then the computer program may launch a designated monitoring component and then register with the launched monitoring component.

At operation 720, it is determined whether a crash is detected. In one embodiment, a crash may be detected by the out-of-process monitoring component, such as based, at least in part, on a signal from the computer program or on non-responsiveness of the computer program (e.g., failure to respond to a message from the monitoring component, failure to or issue a periodic heartbeat signal, etc.). At operation 722, crash metadata for the detected crash is generated, for example by the monitoring component that detects the crash. Some example contents of crash metadata are described in detail above and are not repeated here. In some examples, the crash metadata may be generated based, at least in part, on information that may be stored by, readily accessible to, and/or promptly determined by the monitoring component, such as information that is passed to the monitoring component when the computer program registers with the monitoring component. For example, in some cases, when the computer program registers with the monitoring component, information regarding a program name, a component name, an engine version, a program version, a client identifier, a session identifier, a platform name, a platform version, a graphics device, a graphics card, a graphics memory amount, a locale, and other associated information may be provided to and/or collected by the monitoring component.

At operation 724, the crash metadata may be stored in a respective crash record, which is a record of crash-related information that may be generated for the crash. In one embodiment, the monitoring component may provide the crash metadata to an interface, such as an API gateway, which may, in turn, launch an event-triggered processing function that generates the crash record in a searchable crash information storage (e.g., crash information storage 418 of FIG. 4) and stores the crash metadata in the respective record. At operation 726, a crash notification is issued, which may be a notification of the occurrence of the crash and also a notification that the crash metadata is available for retrieval, for example from the searchable crash information storage. In one embodiment, the notification may be issued by the event-triggered processing function via a notification service (e.g., crash report notification service 416 of FIG. 4). In some examples, subscribers to this notification may include the program developer, custom (e.g., program-specific processing flows, a telemetry system, and other subscribers.

At operation 728, generation of crash artifact data for the generated crash is initiated. As set forth above, the crash artifact data may include data, such as a crash dump file, error logs, server logs, client logs and/or other data. In one embodiment, the crash artifact data may be generated by the monitoring component, for example based information provided by the computer program and/or the process in which the computer program executes. Thus, the crash metadata and the crash artifact data may be provided in two separate stages, and it is expected that the crash artifact data will typically not be generated and provided until after the crash metadata has already been provided. As set forth above, by employing multiple stages for reporting of crash metadata and crash artifact data, the time required to notify and provide at least some crash-related information to users may be reduced, without requiring the omission of any desired reporting information. Additionally, the use of multiple stages may help to ensure that a notification of the occurrence of the crash and associated metadata are consistently reported, even when crash artifact data uploads fail. Thus, for example, it is noted that operations 722, 724, and 726 may be performed even in some cases when crash artifact data uploads fail, thereby ensuring that the crash metadata and crash notifications may still be provided to developers and other users.

At operation 730, it is determined whether the generation of the crash artifact data is completed. Referring now to FIG. 7B, when the generation of the crash artifact data is completed, the process proceeds to operation 732, at which the crash artifact data is uploaded for stack trace generation. In one embodiment, a processing function that is triggered by the crash metadata upload may return, to the crash monitoring component, crash artifact data upload information, such as a location (e.g., crash artifact bucket 313 of FIG. 3 and corresponding key) as well as temporary credentials for uploading of the crash artifact data. The monitoring component may use this information to upload the crash artifact data, for example to crash artifact bucket 313. In some examples, crash artifact data may be packed into a compressed file and uploaded as a single file, for example using parallelized multi-part uploads. In one embodiment, crash artifact data from trusted sources may be stored in a separate location (e.g., folder within crash artifact bucket 313) than crash artifact data from untrusted sources. This may, for example, allow information from untrusted sources to be treated with more scrutiny during debugging. In some examples, to provide additional security, a crash reporting system may maintain a list of known trusted users, and crash artifact data may be considered trusted when the crash artifact data is obtained from a program having a client and/or user that is included in the list of known trusted users.

At operation 734, a notification is issued that the crash artifact data is available for retrieval, such as for use in stack trace generation. In some examples, the subscribers to this notification may include a queue of uploaded crash artifact data (e.g., crash artifact queue 413 of FIG. 4), custom (e.g., program-specific) process flows, a telemetry system, and other subscribers. The crash artifact data queue may be employed to queue uploaded crash artifact data for generation of a respective stack trace. At operation 736, a stack trace, such as a human-readable stack trace, is generated. The stack trace may be generated based, at least in part, on the crash artifact data and the downloaded debugging symbols. In one embodiment, the stack trace may be generated by one or more backend server components (e.g., stack trace generators 414 of FIG. 4) to which the stored debugging symbols are accessible. As set forth above, because the debugging symbols may be translated into a platform-independent format, the stack trace generators need not necessarily execute on the same platform as the crashed computer program. In some examples, crash artifact data may be assigned to a first queue of crash artifact data that is available for stack trace generation, and a quantity of components assigned to service the first queue may be scaled up or down in quantity and/or capacity depending upon the size of the first queue. Also, in one embodiment, upon a failed attempt to generate a stack trace for the crash, the crash artifact data may be assigned to a second queue that enables reattempting of generating of the stack trace. As set forth above, a delay in downloading of the respective debugging symbols may sometimes result in an inability to generate the stack trace, and, in some cases, the crash artifact data may be retained in the second queue until the respective debugging symbols have been downloaded and made available for stack trace generation.

At operation 738, the generated stack trace is stored in the respective crash record for the crash. For example, stack trace generators 414 of FIG. 4 may identify a respective crash record within crash information storage 418 of FIG. 4 and update that record with the stack trace and optionally the crash artifact data. At operation 740, a notification is issued that the stack trace is available for retrieval, for example from crash information storage 418. In some examples, the subscribers to this notification may include custom (e.g., program-specific) process flows, a telemetry system, and other subscribers. At operation 742, the crash is debugged. For example, developers may use an interface, such as interfaces 511 of FIG. 5 and/or 600 of FIG. 6, to retrieve crash metadata, crash artifact data, the stack trace and other crash-related information. Additionally, the downloaded debugging symbols may also be made available to developers. As set forth above, in some examples, to allow more efficient and robust searching, crash information storage 418 of FIG. 4 may be a datastore that allows free query across a number of different metadata fields. Crash information storage 418 may also allow use of various plugins and other additional components to perform analysis and create dashboards. In addition to developer analysis, it is noted that the above described process offers a number of event hooks for generated information to be made available to various additional subscribers as described in detail above. For example, as described in detail above, custom processing for one or more particular computer programs and/or reporting of information to a telemetry system may be triggered based on any or all of the notifications described in the process of FIGS. 7A-7B (e.g., the symbol availability notification, the crash metadata availability notification, the crash artifact data availability notification, the stack trace availability notification, and/or other notifications).

It is noted that, while the above description refers to detection and reporting of crashes, the above described techniques may also be applied to detection and reporting of other program error states (e.g., a non-responsive state, a deadlock state, etc.) or other specified program conditions in addition or, as an alternative, to crashes. This may be advantageous, for example, by allowing developers and other interested parties to collect, analyze, and/or debug information about these other error states or other program conditions without necessarily requiring a crash. In one embodiment, the above described techniques may be applied to these other program error states or other program conditions by substituting a reference to a crash in the above description for a reference to any, or all, of these other error states or other program conditions. In particular, in one embodiment, a designated error state or other program condition may be detected by a monitoring component, metadata associated with the error state or other program condition may be generated, a notification may be issued that the error state or other program condition has occurred and/or that metadata is available for retrieval, artifact data associated with the error state or other program condition may be generated, a notification may be issued that the artifact data is available for retrieval, a stack trace may be generated for the error state or other program condition, a notification may be issued that the stack trace is available for retrieval, and debugging of the error state, other program condition and/or computer program may be performed based on the metadata, artifact data, stack trace, and other related information.

Figure 8:
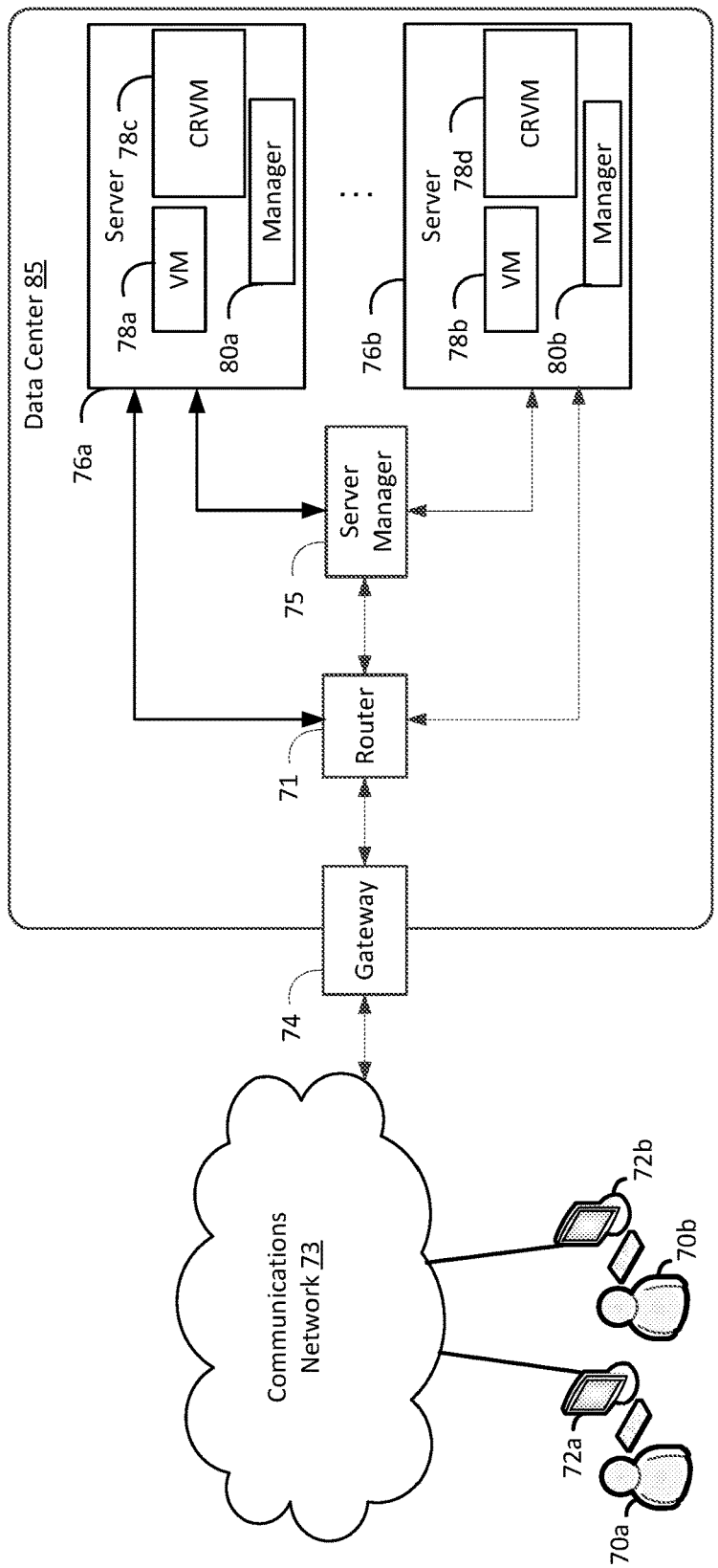
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are crash reporting virtual machine ("CRVM") instances. The CRVM virtual machine instances 78c and 78d may be configured to perform various aspects of the multiple stage crash reporting techniques and/or any other of the disclosed techniques in accordance with the present disclosure and described in detail above. As should be appreciated, while the particular example illustrated in FIG. 8 includes one CRVM virtual machine in each server, this is merely an example. A server may include more than one CRVM virtual machine or may not include any CRVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
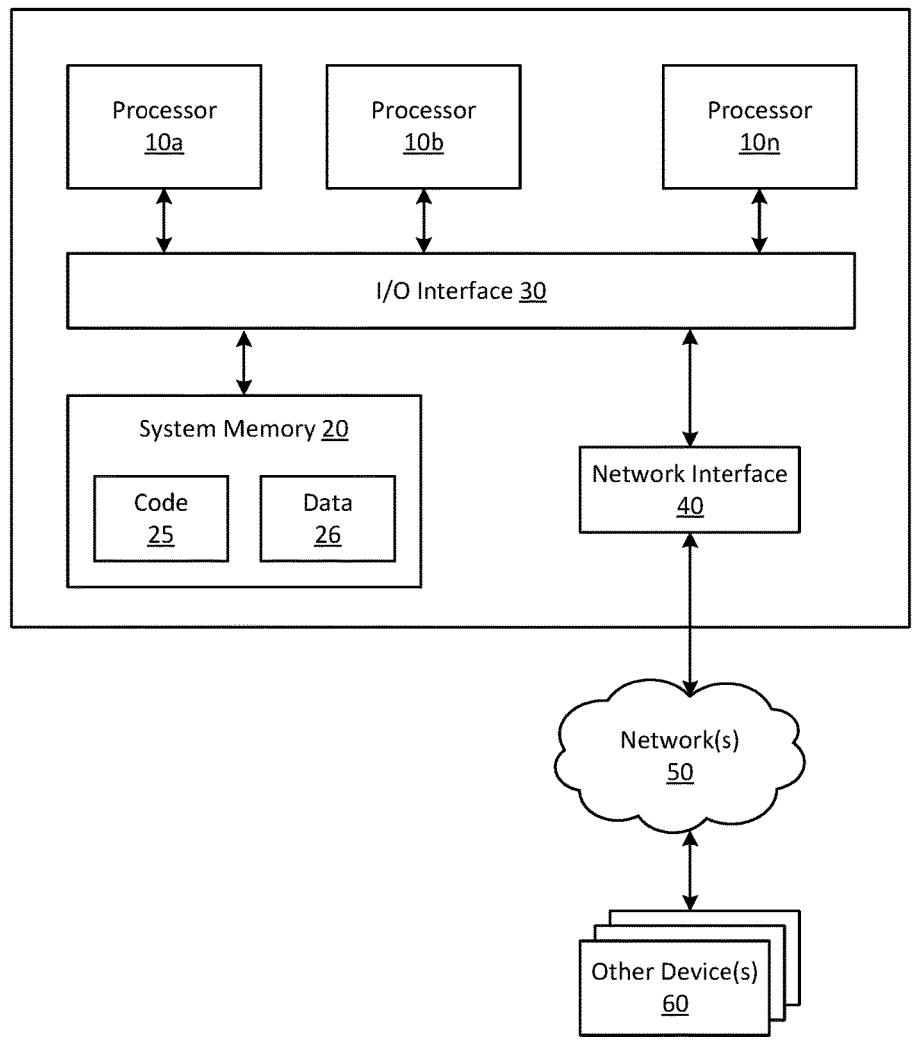
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a solid-state drive (SSD), memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for crash reporting comprising:
   one or more processors; and
   one or more memories having stored therein instructions that, upon execution by the one or more processors, cause the system perform operations comprising:
   receiving debugging symbols associated with a computer program;
   storing the debugging symbols externally to the computer program at a server-accessible location;
   detecting a crash of an execution of the computer program;
   generating metadata associated with the crash of the computer program;
   issuing a first notification that the metadata is available for retrieval;
   generating artifact data associated with the crash of the computer program;
   issuing a second notification that the artifact data is available for retrieval;
   generating, by one or more server components, a stack trace based, at least in part, on the debugging symbols and the artifact data; and
   issuing a third notification that the stack trace is available for retrieval.

2. The system of claim 1, further comprising storing artifact data generated from untrusted sources in a separate location than artifact data generated from trusted sources.

3. The system of claim 1, wherein a monitoring component external to a process that executes the computer program performs at least one of the detecting of the crash, the generating of the metadata, or the generating of the artifact data.

4. The system of claim 1, wherein custom processing for one or more particular computer programs is triggered based on at least one of the first notification, the second notification, or the third notification.

5. A method for error state reporting comprising:
   receiving debugging symbols associated with a computer program;
   detecting an error state of an execution of the computer program;
   generating metadata associated with the error state of the computer program;
   issuing a first notification that the metadata is available for retrieval;
   generating artifact data associated with the error state of the computer program;
   issuing a second notification that the artifact data is available for retrieval;
   generating a stack trace based, at least in part, on the debugging symbols and the artifact data; and
   issuing a third notification that the stack trace is available for retrieval.

6. The method of claim 5, wherein the stack trace is generated by one or more server components, and wherein the debugging symbols are stored externally to the computer program at one or more locations accessible to the one or more server components.

7. The method of claim 5, wherein the error state comprises at least one of a crash, a non-responsive state, or a deadlock state.

8. The method of claim 5, further comprising storing artifact data generated from untrusted sources in a separate location than artifact data generated from trusted sources.

9. The method of claim 5, wherein a monitoring component external to a process that executes the computer program performs at least one of the detecting of the error state, the generating of the metadata, or the generating of the artifact data.

10. The method of claim 9, wherein the monitoring component monitors a plurality of computer programs that are registered to the monitoring component.

11. The method of claim 5, wherein custom processing for one or more particular computer programs is triggered based on at least one of the first notification, the second notification, or the third notification.

12. The method of claim 5, wherein reporting of information to a telemetry system is triggered based on at least one of the first notification, the second notification, or the third notification.

13. The method of claim 5, wherein the artifact data is assigned to a first queue of artifact data that is available for stack trace generation, and wherein a quantity of components assigned to service the first queue is scaled based, at least in part, on a size of the first queue.

14. The method of claim 13, wherein, upon a failed attempt to generate a stack trace for the error state, the artifact data is assigned to a second queue that enables reattempting of the generating the stack trace.

15. The method of claim 13, further comprising translating the debugging symbols from a platform-specific format to a platform-independent format.

16. A non-transitory computer-readable medium having stored thereon a set of instructions, which if performed by a machine, causes the machine to perform a method comprising:
   receiving debugging symbols associated with a computer program;
   detecting an error state of an execution of the computer program;
   generating metadata associated with the error state of the computer program;
   issuing a first notification that the metadata is available for retrieval;
   generating artifact data associated with the error state of the computer program;
   issuing a second notification that the artifact data is available for retrieval;
   generating a stack trace based, at least in part, on the debugging symbols and the artifact data; and
   issuing a third notification that the stack trace is available for retrieval.

17. The non-transitory computer-readable medium of claim 16, wherein the error state comprises at least one of a crash, a non-responsive state, or a deadlock state.

18. The non-transitory computer-readable medium of claim 16, wherein the method further comprises storing artifact data generated from untrusted sources in a separate location than artifact data generated from trusted sources.

19. The non-transitory computer-readable medium of claim 16, wherein reporting of information to a telemetry system is triggered based on at least one of the first notification, the second notification, or the third notification.

20. The non-transitory computer-readable medium of claim 16, wherein the artifact data is assigned to a first queue of artifact data that is available for stack trace generation, and wherein a quantity of components assigned to service the first queue is scaled based, at least in part, on a size of the first queue.

* * * * *